United States Patent
Aziz et al.

(10) Patent No.: US 9,071,638 B1
(45) Date of Patent: *Jun. 30, 2015

(54) SYSTEM AND METHOD FOR MALWARE CONTAINMENT

(71) Applicant: FireEye, Inc., Milpitas, CA (US)

(72) Inventors: Ashar Aziz, Fremont, CA (US); Wei-Lung Lai, Cupertino, CA (US); Jayaraman Manni, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,381

(22) Filed: Oct. 21, 2013

Related U.S. Application Data

(63) Continuation of application No. 11/717,475, filed on Mar. 12, 2007, now Pat. No. 8,566,946, and a continuation-in-part of application No. 11/494,990, filed on Jul. 28, 2006, now Pat. No. 8,375,444, which (Continued)

(51) Int. Cl.
  *G06F 11/00* (2006.01)
  *H04L 29/06* (2006.01)
(52) U.S. Cl.
  CPC ..................... *H04L 63/145* (2013.01)
(58) Field of Classification Search
  CPC ........................................... G06F 11/00
  USPC .............. 726/1, 2, 3, 22, 23, 24, 25, 26, 27; 713/1, 156
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,657,473 A | 8/1997 | Killean et al. |
| 5,842,002 A | 11/1998 | Schnurer et al. |
| 5,978,917 A | 11/1999 | Chi |

(Continued)

FOREIGN PATENT DOCUMENTS

| | | |
|---|---|---|
| GB | 2439806 | 1/2008 |
| WO | WO-02/06928 | 1/2002 |

(Continued)

OTHER PUBLICATIONS

*Cisco, Configuring the Catalyst Switched Port Analyzer (SPAN)* ("*Cisco*"), (1992-2003 Cisco Systems).

(Continued)

*Primary Examiner* — Abu Sholeman
(74) *Attorney, Agent, or Firm* — Rutan & Tucker LLP; William W. Schaal

(57) ABSTRACT

Systems and methods for malware containment on connection is provided. In exemplary embodiments, digital devices are quarantined for a predetermined period of time upon connection to the communication network. When a digital device is quarantined, all network data transmitted by the digital device is temporarily directed to a controller which then analyzes the network data to identify unauthorized activity and/or malware within the newly connected digital device. An exemplary method to contain malware comprises detecting a digital device upon connection with a communication network, temporarily redirecting network data from the digital device, and analyzing the network data to identify malware within the digital device.

45 Claims, 7 Drawing Sheets

Related U.S. Application Data is a continuation-in-part of application No. 11/471,072, filed on Jun. 19, 2006, now Pat. No. 8,584,239, which is a continuation-in-part of application No. 11/409,355, filed on Apr. 20, 2006, now Pat. No. 8,171,553, which is a continuation-in-part of application No. 11/096,287, filed on Mar. 31, 2005, now Pat. No. 8,528,086, which is a continuation-in-part of application No. 11/151,812, filed on Jun. 13, 2005, now Pat. No. 8,549,638, which is a continuation-in-part of application No. 11/152,286, filed on Jun. 13, 2005, now Pat. No. 8,006,305.

(60) Provisional application No. 60/559,198, filed on Apr. 1, 2004, provisional application No. 60/579,953, filed on Jun. 14, 2004, provisional application No. 60/579,910, filed on Jun. 14, 2004.

(56) References Cited

U.S. PATENT DOCUMENTS

| | | | |
|---|---|---|---|
| 6,088,803 | A | 7/2000 | Tso et al. |
| 6,094,677 | A | 7/2000 | Capek et al. |
| 6,269,330 | B1 | 7/2001 | Cidon et al. |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sorhaug et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 * | 9/2005 | Petry et al. ............... 709/206 |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,069,316 | B1 | 6/2006 | Gryaznov |
| 7,080,408 | B1 | 7/2006 | Pak et al. |
| 7,093,239 | B1 | 8/2006 | van der Made |
| 7,096,498 | B2 * | 8/2006 | Judge ............... 726/22 |
| 7,100,201 | B2 | 8/2006 | Izatt |
| 7,159,149 | B2 | 1/2007 | Spiegel et al. |
| 7,213,260 | B2 * | 5/2007 | Judge ............... 726/3 |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,249,175 | B1 * | 7/2007 | Donaldson ............... 709/225 |
| 7,287,278 | B2 | 10/2007 | Liang |
| 7,308,716 | B2 | 12/2007 | Danford et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 * | 2/2009 | Zimmer et al. ............... 726/23 |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,565,550 | B2 | 7/2009 | Liang et al. |
| 7,603,715 | B2 | 10/2009 | Costa et al. |
| 7,639,714 | B2 | 12/2009 | Stolfo et al. |
| 7,644,441 | B2 | 1/2010 | Schmid et al. |
| 7,676,841 | B2 | 3/2010 | Sobchuk et al. |
| 7,698,548 | B2 | 4/2010 | Shelest et al. |
| 7,707,633 | B2 | 4/2010 | Danford et al. |
| 7,779,463 | B2 | 8/2010 | Stolfo et al. |
| 7,784,097 | B1 | 8/2010 | Stolfo et al. |
| 7,849,506 | B1 | 12/2010 | Dansey et al. |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,937,761 | B1 | 5/2011 | Bennett |
| 7,996,556 | B2 | 8/2011 | Raghavan et al. |
| 7,996,836 | B1 | 8/2011 | McCorkendale et al. |
| 7,996,905 | B2 | 8/2011 | Arnold et al. |
| 8,006,305 | B2 | 8/2011 | Aziz |
| 8,020,206 | B2 | 9/2011 | Hubbard et al. |
| 8,069,484 | B2 | 11/2011 | McMillan et al. |
| 8,171,553 | B2 | 5/2012 | Aziz et al. |
| 8,204,984 | B1 | 6/2012 | Aziz et al. |
| 8,220,055 | B1 | 7/2012 | Kennedy |
| 8,291,499 | B2 | 10/2012 | Aziz et al. |
| 8,321,941 | B2 | 11/2012 | Tuvell et al. |
| 8,375,444 | B2 | 2/2013 | Aziz et al. |
| 8,516,593 | B2 | 8/2013 | Aziz |
| 8,528,086 | B1 | 9/2013 | Aziz |
| 8,539,582 | B1 | 9/2013 | Aziz et al. |
| 8,549,638 | B2 | 10/2013 | Aziz |
| 8,561,177 | B1 | 10/2013 | Aziz et al. |
| 8,566,946 | B1 | 10/2013 | Aziz et al. |
| 8,584,239 | B2 | 11/2013 | Aziz et al. |
| 8,635,696 | B1 | 1/2014 | Aziz |
| 8,739,280 | B2 * | 5/2014 | Chess et al. ............... 726/22 |
| 2001/0005889 | A1 | 6/2001 | Albrecht |
| 2001/0047326 | A1 | 11/2001 | Broadbent et al. |
| 2002/0018903 | A1 | 2/2002 | Kokubo et al. |
| 2002/0038430 | A1 | 3/2002 | Edwards et al. |
| 2002/0091819 | A1 | 7/2002 | Melchione et al. |
| 2002/0144156 | A1 | 10/2002 | Copeland, III |
| 2002/0162015 | A1 | 10/2002 | Tang |
| 2002/0166063 | A1 | 11/2002 | Lachman et al. |
| 2002/0184528 | A1 | 12/2002 | Shevenell et al. |
| 2002/0188887 | A1 | 12/2002 | Largman et al. |
| 2002/0194490 | A1 | 12/2002 | Halperin et al. |
| 2003/0074578 | A1 | 4/2003 | Ford et al. |
| 2003/0084318 | A1 | 5/2003 | Schertz |
| 2003/0115483 | A1 | 6/2003 | Liang |
| 2003/0188190 | A1 | 10/2003 | Aaron et al. |
| 2003/0200460 | A1 | 10/2003 | Morota et al. |
| 2003/0212902 | A1 | 11/2003 | Van Der Made |
| 2003/0237000 | A1 | 12/2003 | Denton et al. |
| 2004/0003323 | A1 | 1/2004 | Bennett et al. |
| 2004/0015712 | A1 | 1/2004 | Szor |
| 2004/0019832 | A1 | 1/2004 | Arnold et al. |
| 2004/0047356 | A1 | 3/2004 | Bauer |
| 2004/0083408 | A1 | 4/2004 | Spiegel et al. |
| 2004/0088581 | A1 * | 5/2004 | Brawn et al. ............... 713/201 |
| 2004/0111531 | A1 | 6/2004 | Staniford et al. |
| 2004/0117478 | A1 | 6/2004 | Triulzi et al. |
| 2004/0117624 | A1 * | 6/2004 | Brandt et al. ............... 713/166 |
| 2004/0165588 | A1 | 8/2004 | Pandya |
| 2004/0236963 | A1 | 11/2004 | Danford et al. |
| 2004/0243349 | A1 | 12/2004 | Greifeneder et al. |
| 2004/0249911 | A1 | 12/2004 | Alkhatib et al. |
| 2004/0255161 | A1 | 12/2004 | Cavanaugh |
| 2004/0268147 | A1 | 12/2004 | Wiederin et al. |
| 2005/0005159 | A1 * | 1/2005 | Oliphant ............... 713/200 |
| 2005/0033960 | A1 | 2/2005 | Vialen et al. |
| 2005/0033989 | A1 | 2/2005 | Poletto et al. |
| 2005/0050148 | A1 | 3/2005 | Mohammadioun et al. |
| 2005/0086523 | A1 * | 4/2005 | Zimmer et al. ............... 713/201 |
| 2005/0091513 | A1 | 4/2005 | Mitomo et al. |
| 2005/0091533 | A1 | 4/2005 | Omote et al. |
| 2005/0114663 | A1 | 5/2005 | Cornell et al. |
| 2005/0125195 | A1 | 6/2005 | Brendel |
| 2005/0157662 | A1 | 7/2005 | Bingham et al. |
| 2005/0183143 | A1 | 8/2005 | Anderholm et al. |

(56) References Cited

U.S. PATENT DOCUMENTS

| | | |
|---|---|---|
| 2005/0201297 A1 | 9/2005 | Peikari |
| 2005/0210533 A1 | 9/2005 | Copeland et al. |
| 2005/0238005 A1* | 10/2005 | Chen et al. ............... 370/389 |
| 2005/0262562 A1 | 11/2005 | Gassoway |
| 2005/0265331 A1 | 12/2005 | Stolfo |
| 2006/0010495 A1 | 1/2006 | Cohen et al. |
| 2006/0015416 A1* | 1/2006 | Hoffman et al. ............ 705/28 |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0142030 A1* | 6/2007 | Sinha et al. ............... 455/410 |
| 2007/0143827 A1 | 6/2007 | Nicodemus et al. |
| 2007/0156895 A1 | 7/2007 | Vuong |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2* | 11/2007 | Oliphant ..................... 726/25 |
| 2007/0271446 A1 | 11/2007 | Nakamura |
| 2008/0005782 A1 | 1/2008 | Aziz |
| 2008/0072326 A1 | 3/2008 | Danford et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0215742 A1 | 9/2008 | Goldszmidt et al. |
| 2008/0222729 A1 | 9/2008 | Chen et al. |
| 2009/0003317 A1 | 1/2009 | Kasralikar et al. |
| 2009/0031423 A1 | 1/2009 | Liu et al. |
| 2009/0083369 A1 | 3/2009 | Marmor |
| 2009/0083855 A1 | 3/2009 | Apap et al. |
| 2009/0193293 A1 | 7/2009 | Stolfo et al. |
| 2009/0271867 A1 | 10/2009 | Zhang |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0054278 A1 | 3/2010 | Stolfo et al. |
| 2010/0115621 A1 | 5/2010 | Staniford et al. |
| 2010/0192223 A1 | 7/2010 | Ismael et al. |
| 2010/0281541 A1 | 11/2010 | Stolfo et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0247072 A1 | 10/2011 | Staniford et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0222121 A1 | 8/2012 | Staniford et al. |
| 2013/0036472 A1 | 2/2013 | Aziz |
| 2013/0227691 A1 | 8/2013 | Aziz et al. |
| 2013/0291109 A1 | 10/2013 | Staniford et al. |

FOREIGN PATENT DOCUMENTS

| | | |
|---|---|---|
| WO | WO-02/23805 | 3/2002 |
| WO | WO-2008/041950 | 4/2008 |
| WO | WO-2012/145066 | 10/2012 |

OTHER PUBLICATIONS

Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("*Sailer*").

Excerpt regarding First Printing Date for Merike Kaeo, *Designing Network Security* ("*Kaeo*"), (Copyright 2005).

"Network Security: NetDetector—Network Intrusion Forensic System (NIFS) Whitepaper", ("*NetDetector Whitepaper*"), (Copyright 2003).

"Packet", *Microsoft Computer Dictionary*, Microsoft Press, (Mar. 2002), 1 page.

Adetoye, Adedayo, et al., "Network Intrusion Detection & Response System", ("*Adetoye*"), (Sep. 2003).

Baecher, "The Nepenthes Platform: An Efficient Approach to collect Malware", *Springer-verlag Berlin Heidelberg*, (2006), pp. 165-184.

Bayer, et al., "Dynamic Analysis of Malicious Code", *J Comput Virol*, Springer-Verlag, France., (2006), pp. 67-77.

Boubalos, Chris, "extracting syslog data out of raw pcap dumps, seclists.org, Honeypots mailing list archives", *available at* http://seclists.org/honeypots/2003/q2/319 ("*Boubalos*"), (Jun. 5, 2003).

Chaudet, C., et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Costa, M., et al., "Vigilante: End-to-End Containment of Internet Worms", *SOSP '05, Association for Computing Machinery, Inc.*, Brighton U.K., (Oct. 23-26, 2005).

Crandall, J.R., et al., "Minos:Control Data Attack Prevention Orthogonal to Memory Model", *37th International Symposium on Microarchitecture*, Portland, Oregon, (Dec. 2004).

Distler, "Malware Analysis: An Introduction", *SANS Institute InfoSec Reading Room*, SANS Institute, (2007).

Dunlap, George W., et al., "ReVirt: Enabling Intrusion Analysis through Virtual-Machine Logging and Replay", *Proceeding of the 5th Symposium on Operating Systems Design and Implementation, USENIX Association*, ("*Dunlap*"), (Dec. 9, 2002).

Kaeo, Merike, "Designing Network Security", ("*Kaeo*"), (Nov. 2003).

Kim, H., et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", ("*King*").

Krasnyansky, Max, et al., *Universal TUN/TAP driver, available at* https://www.kernel.org/doc/Documentation/networking/tuntap.txt (2002) ("*Krasnyansky*"), *Exhibit 1027.*

(56) References Cited

OTHER PUBLICATIONS

Kreibich, C., et al., "Honeycomb-Creating Intrusion Detection Signatures Using Honeypots", *2nd Workshop on Hot Topics in Networks (HotNets-II)*, Boston, USA, (2003).

Kristoff, J., "Botnets, Detection and Mitigation: DNS-Based Techniques", *NU Security Day*, (2005), 23 pages.

Liljenstam, Michael, et al., "Simulating Realistic Network Traffic for Worm Warning System Design and Testing", *Institute for Security Technology studies, Dartmouth College*, ("Liljenstam"), (Oct. 27, 2003).

Marchette, David J., "Computer Intrusion Detection and Network Monitoring: A Statistical Viewpoint", (*"Marchette"*), (2001).

Margolis, P.E., "Random House Webster's 'Computer & Internet Dictionary 3rd Edition'", ISBN 0375703519, (Dec. 1998).

Moore, D., et al., "Internet Quarentine: Requirements for Containing Self-Propagating Code", *INFOCOM*, vol. 3, (Mar. 30-Apr. 3, 2003), pp. 1901-1910.

Natvig, Kurt, "SANDBOXII: INTERNET", *Virus Bulletin Conference*, ("Natvig"), (Sep. 2002).

Newsome, J., et al., "Dymanic Taint Analysis for Automatic Detection, Analysis, and Signature Generation of Exploits on Commodity Software", *In Proceedings Annual Network and Distributed System Security, Symposium (NDSS'05)*, (Feb. 2005).

Newsome, J., et al., "Polygraph: Automatically Generating Signatures for Polymorphic Worms", *In proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual is Better Than Real, Department of Electrical Engineering and Computer Science", *University of Michigan* (*"Chen"*).

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", (*"Spizner"*), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003).

Whyte, et al., "DNS-Based Detection of Scanning Works in an Enterprise Network", *Proceedeings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las vegas, NV, USA, (Dec. 2002), pp. 1-9.

Aziz, Ashar, System and Method for Malware Containment, U.S. Appl. No. 14/620,060, filed Feb. 11, 2015, Non-Final Office Action dated Apr. 3, 2015.

* cited by examiner

SYSTEM AND METHOD FOR MALWARE CONTAINMENT

CROSS-REFERENCE TO RELATED APPLICATIONS

This application is a continuation of U.S. patent application Ser. No. 11/717,475, filed Mar. 12, 2007, and is a continuation-in-part of U.S. patent application Ser. No. 11/494,990, filed Jul. 28, 2006, entitled "Dynamic Signature Creation and Enforcement", which is a continuation-in-part of U.S. patent application Ser. No. 11/471,072, filed Jun. 19, 2006, entitled "Virtual Machine with Dynamic Data Flow Analysis", which is a continuation-in-part of U.S. patent application Ser. No. 11/409,355, filed Apr. 20, 2006, entitled "Heuristic Based Capture with Replay to Virtual Machine", which claims benefit to U.S. patent application Ser. No. 11/096,287, filed Mar. 31, 2005, entitled "System and Method of Detecting Computer Worms," U.S. patent application Ser. No. 11/151,812, filed Jun. 13, 2005, entitled "System and Method of Containing Computer Worms," and U.S. patent application Ser. No. 11/152,286, Jun. 13, 2005, entitled "Computer Worm Defense System and Method" all of which are incorporated by reference herein.

U.S. patent application Ser. No. 11/096,287, filed Mar. 31, 2005, entitled "System and Method of Detecting Computer Worms," claims benefit to provisional patent application No. 60/559,198, filed Apr. 1, 2004, entitled "System and Method of Detecting Computer Worms." U.S. patent application Ser. No. 11/151,812, filed Jun. 13, 2005, entitled "System and Method of Containing Computer Worms," claims benefit of provisional patent application No. 60/579,953, filed Jun. 14, 2004, entitled "System and Method of Containing Computer Worms" U.S. patent application Ser. No. 11/152,286, filed Jun. 13, 2005, entitled "Computer Worm Defense System and Method," claims benefit of provisional patent application No. 60/579,910, filed Jun. 14, 2004, entitled "Computer Worm Defense System and Method." The above-referenced provisional patent applications are also incorporated by reference herein.

This application is also related to U.S. patent application Ser. No. 11/717,408, filed Mar. 12, 2007, entitled "Malware Containment and Security Analysis on Connection", U.S. patent application Ser. No. 11/717,474, filed Mar. 12, 2007, entitled "Systems and Methods for Malware Attack Prevention, and U.S. patent application Ser. No. 11/717,476, filed Mar. 12, 2007, entitled "Systems and Methods for Malware Attack Detection and Identification". The above-referenced related nonprovisional patent applications are also incorporated by reference herein.

BACKGROUND OF THE INVENTION

1. Field of the Invention

The present invention relates generally to containment of malware. More particularly, the present invention relates to the containment of malware attacks from digital devices upon connection to a communication network.

2. Background Art

As the workplace becomes more automated, the use of computers and networks is commonplace. Computers have become indispensable tools that afford access to files and resources. Unfortunately, computers and networks can also place those files and resources at risk.

Computers can become infected with worms and viruses that replicate themselves and seek to damage files or limit network resources. As such, it is not uncommon to read in newspapers of a single infected computer that limited or destroyed the functionality of one or more networks. The cost caused by the damage from these attacks is enormous.

Currently, information technology (IT) staff and administrators have sought to limit worms and viruses by cleaning individual computers of worms/viruses, requiring anti-virus applications, and installing firewall applications on network servers and routers. Once the network is clear of worms and viruses, the IT staff and administrators continue to upgrade antivirus/firewall applications as well as virus/worm definitions for each server and router.

Even if the network is clean of viruses and worms, computers may still become infected. In one example, users of computers connected to an otherwise "clean" network may bring their computer home from work where the computer becomes infected over the Internet or a home network. Even if the computer has an anti-virus application resident on the machine, the anti-virus application may be insufficient to block or correct all possible attacking worms or viruses. Further, the anti-virus application or the worm/virus signature files may be out of date. Moreover, some worms or viruses may not be identified by some anti-virus applications or the worms or viruses may not be previously identified (e.g., a "zero day" attack) and, as such, a worm/virus signature that identifies the worm or virus may not exist. When the computer is brought back to work and reconnected to the network, the worm or virus may activate, make copies of itself, identify other machines on the network, gather information about the network, compromise network security, and/or infect other machines.

SUMMARY OF THE INVENTION

Systems and methods for malware containment on connection are provided. In exemplary embodiments, newly coupled digital devices are temporarily redirected for a predetermined period of time upon connection to the communication network. When a newly coupled digital device is quarantined, all network data transmitted by the digital device is temporarily redirected to a controller which then analyzes the network data to detect unauthorized activity and/or malware within the newly coupled digital device. An exemplary method to contain malware comprises detecting a digital device upon connection with a communication network, temporarily redirecting network data from the digital device for a predetermined period of time, and analyzing the network data received from the digital device to detect malware within the digital device. In some embodiments, the method further comprises determining if the digital device is associated with a white list.

Temporarily redirecting network data can comprise ARP manipulation, the configuration of DHCP services, or the reconfiguration of a switch to direct network data from the digital device to the controller. Analyzing the network data may comprise configuring a virtual machine to receive the network data and analyzing the response of the virtual machine to the network data to detect and/or identify a malware attack. In various embodiments, the method further comprises generating an unauthorized activity signature based on the detection of the malware attack.

Analyzing the network data may comprise analyzing the network data with a heuristic to identify network data containing suspicious activity, configuring a virtual machine to receive the network data, and analyzing the response of the virtual machine to the network data to detect and/or identify the malware within the digital device. Further, analyzing the network data may comprise retrieving a virtual machine configured to receive the network data, configuring a replayer to transmit the network data to the virtual machine, and analyzing a response by the virtual machine to the network data to detect and/or identify the malware within the digital device.

A malware containment system can comprise a controller for containing malware. The controller may comprise a quarantine module and an analysis environment. The quarantine module is configured to detect a digital device upon connection with a communication network and temporarily redirect network data from the digital device for a predetermined period of time. The analysis environment can be configured to analyze the network data to identify malware within the digital device.

In various embodiments, a machine readable medium may have embodied thereon executable code, the executable code being executable by a processor for performing a malware containment method. The malware containment method can comprise detecting a digital device upon connection with a communication network, temporarily redirecting the network data from the digital device for a predetermined period of time, and analyzing the network data to detect malware within the digital device.

DESCRIPTION OF EXEMPLARY EMBODIMENTS

Exemplary systems and methods for malware containment are provided. In exemplary embodiments, digital devices are quarantined for a predetermined period of time upon connection. When a digital device is quarantined, all network data transmitted by the digital device is directed to a controller which then analyzes the network data to identify unauthorized activity and/or malware within the newly connected digital device.

If malware is identified as present within the digital machine, corrective action can be taken. Possible corrective actions include, but are not limited to, permanently quarantining the infected digital device, transmitting a patch to remove the malware, generating an unauthorized activity signature, and sending the unauthorized activity signature to the client to remove the malware.

If malware is not identified as present within the digital machine, the network data directed to the controller can be re-transmitted to the proper destination. The quarantine continues until the predetermined period of time expires and no evidence of malware is found.

Malware is software created and distributed for malicious purposes and can take the form of viruses, worms, trojan horses or adware, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm might duplicate itself in a computer so many times that it causes the computer to crash. A trojan horse is a destructive program disguised as a game, utility, or application. When run by a user or computer program, a trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and is similarly unaware of the adware's and/or spyware's function.

Figure 1:
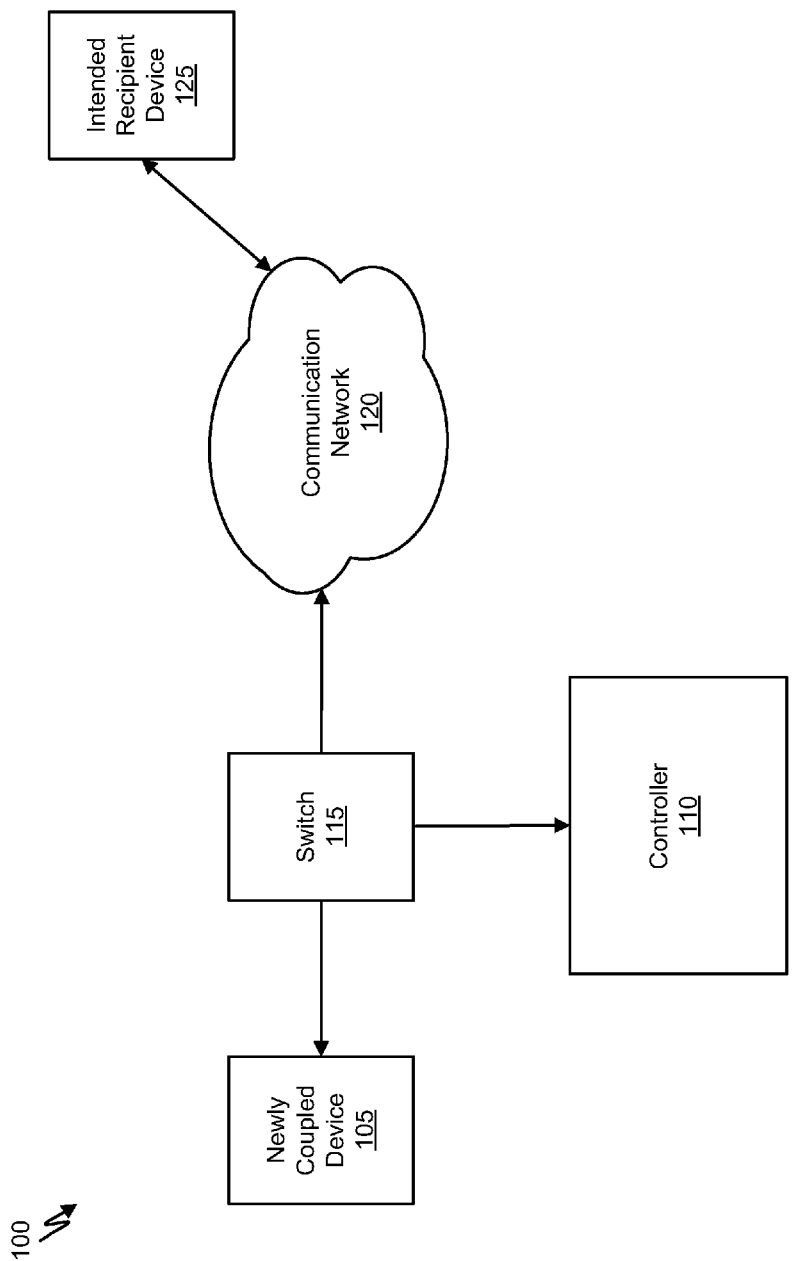
FIG. 1 is a diagram of a malware containment environment in which embodiments of the present invention may be practiced.

FIG. 1 is a diagram of a malware containment environment 100 in which embodiments of the present invention may be practiced. The malware containment environment 100 comprises a newly coupled device 105 and a controller 110 coupled to a switch 115. The switch 115 is further coupled to a communication network 120. An intended recipient device 125 is also coupled to the communication network 120. In some embodiments, the controller 110 is coupled to the switch 115 over a tap (not depicted).

A newly coupled device 105 is any digital device that recently coupled to the switch 115 and/or the communication network 120. The intended recipient device 125 is any digital device that the newly coupled device 105 transmits network data to. A digital device is any device comprising one or more processors. Some examples of digital devices include computers, servers, laptops, personal digital assistants, and cellular telephones. Network data comprises signals and data transmitted from the newly coupled device 105. Although FIG. 1 depicts the intended recipient device 125 as coupled to the communication network 120, the intended recipient device 125 may be directly coupled to the newly coupled device 105 or the switch 115. There may be any number of newly coupled devices 105, controllers 110, switches 115, communication networks 120, and/or intended recipient devices 125.

The controller 110 is any digital device or software configured to receive and analyze network data for the presence of malware. In exemplary embodiments, the controller 110 detects the presence of a newly coupled device 105 when the digital device initially couples to the switch 115 or the communication network 120. The controller 110 intercepts network data transmitted from the newly coupled device 105 for a predetermined period of time. In other embodiments, the switch 115 is configured to direct network data transmitted from the newly coupled device 105 to the controller 110 for the predetermined period of time. The switch 115 is further discussed herein.

The network data is then analyzed by the controller 110 to determine evidence of a malware attack. If malware or an attack is detected, the controller 110 may perform corrective actions. If no malware is detected, the network data may be re-transmitted to the intended recipient device 125 (e.g., another digital device on the communication network 120). The controller 110 is further discussed in FIG. 2.

The switch 115 is any device configured to receive and direct network data between one or more digital devices. Examples of a switch 115 include, but is not limited to, a router, gateway, bridge, and, or server.

The communication network 120 couples two or more digital devices together to allow the digital devices to communicate and transmit network data to each other. In some examples, the communication network 120 can be a public computer network such as the Internet, or a private computer network such as a wireless telecommunication network, wide area network, or local area network. In some embodiments, the communication network 120 comprises multiple routers, bridges, and hubs that couple a large number of digital devices.

In various embodiments, the controller 110 can receive network data from the communication network 120 over a tap (not depicted). The tap is a digital data tap configured to receive network data and provide a copy of the network data to the controller 110. In one example, the tap intercepts and copies network data without an appreciable decline in performance of devices coupled to the communication network 120, the newly coupled device 105, and/or the switch 115. The tap can copy any portion of the network data. For example, the tap can receive and copy any number of data packets from the network data. In other embodiments, the controller 110 receives network data from the communication network 120 over a span port.

In some embodiments, the network data can be organized into one or more data flows and provided to the controller 110. In various embodiments, the tap can sample the network data based on a sampling scheme. Data flows can be reconstructed based on the network data samples.

Figure 2:
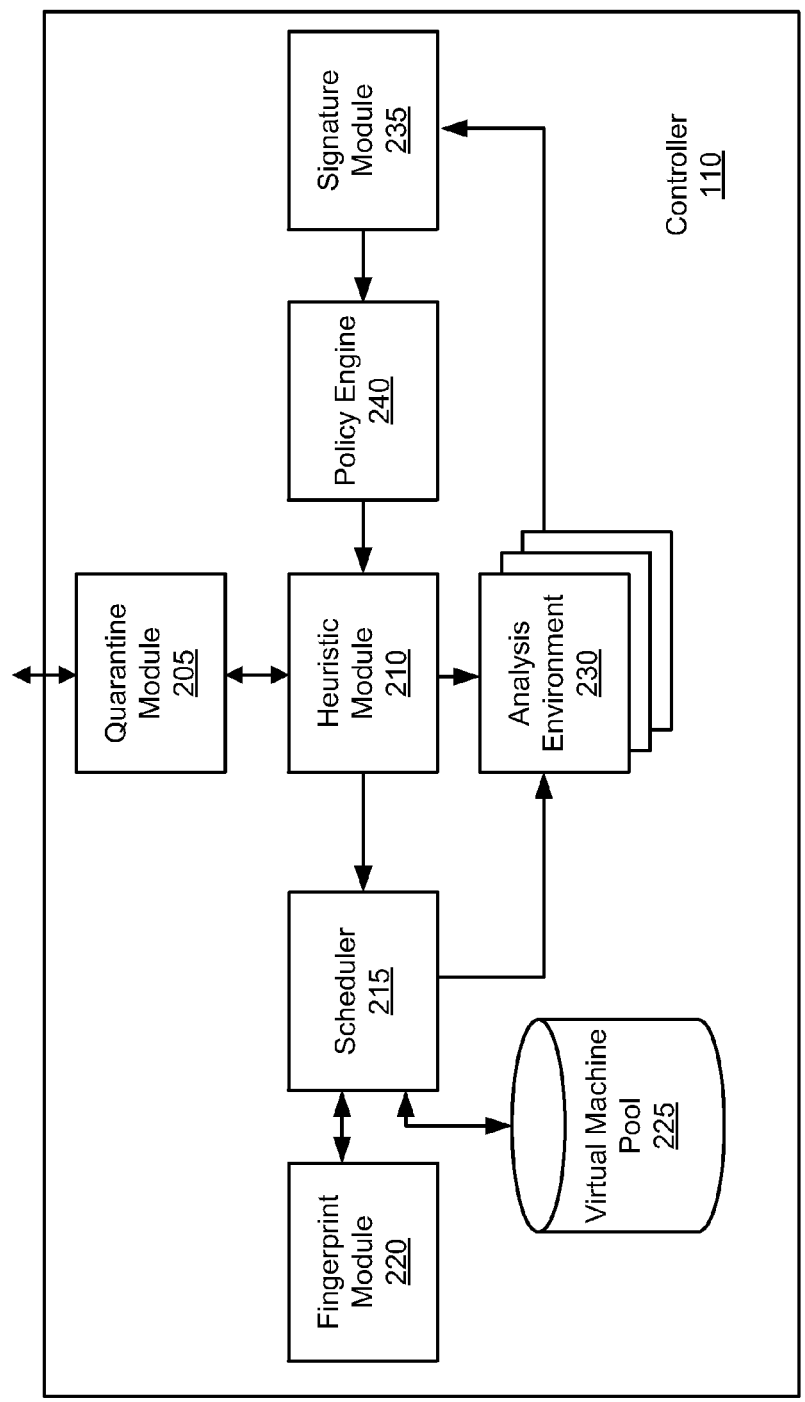
FIG. 2 is a block diagram of an exemplary controller implementing embodiments of the present invention.

FIG. 2 is a block diagram of an exemplary controller 110 implementing embodiments of the present invention. The controller 110 can be any digital device or software that receives network data. The controller 110 can comprise a quarantine module 205, a heuristic module 210, a scheduler 215, a fingerprint module 220, a virtual machine pool 225, an analysis environment 230, a signature module 235, and a policy engine 240. In some embodiments, the controller 110 comprises a tap or span port which is further coupled to the communication network 120. In other embodiments, the controller 110 is coupled to an external tap, external span port, or may be directly coupled to the switch 115 or the communication network 120.

The quarantine module 205 detects one or more newly coupled devices 105 as they operatively couple to the network. When a newly coupled device 105 is detected, network data transmitted from the newly coupled device 105 is quarantined (i.e., temporarily redirected to the controller 110 for a predetermined time). Network data temporarily redirected to the controller 110 is analyzed to determine if the network data contains suspicious data (discussed below) or a malware attack. If the predetermined time expires and no suspicious data or malware is identified, then the quarantine module 205 ceases to redirect network data from the newly coupled device 105. However, if suspicious data or the presence of malware is determined, then corrective action may be taken.

The quarantine module 205 can detect a newly coupled device 105 by detecting a request for network services. When a newly coupled device 105 couples to a network, the newly coupled device 105 is configured for communication with the communication network 120. In one example, a newly coupled device 105 may request an (internet protocol) IP address. The IP address request as well as the IP address assignment may be detected by the quarantine module 205. Thereafter, all network data from the IP address of the newly coupled device 105 may be quarantined for a predetermined period of time. Those skilled in the art will appreciate that there may be many ways to detect a newly coupled device 105 upon connection with the switch 115 and/or the communication network 120.

The quarantine module 205 can redirect network data from the newly coupled device 105 in any number of ways including, but not limited to, Address Resolution Protocol (ARP) manipulation, DHCP services, DHCP manipulation, or configuring the switch 115. In ARP manipulation (also known as ARP spoofing), a newly connected newly coupled device 105 may send an ARP request to the IP address of another digital device (e.g., intended recipient device 125) for the digital device's media access control (MAC) address. The quarantine module 205 may receive the ARP request, store the ARP request, and provide the controller 110 MAC address in an ARP reply to the switch 115 and/or the newly coupled device 105. Once the switch 115 and/or the newly coupled device 105 receives the controller 110 MAC address in the ARP reply, the IP address of the digital device (e.g., intended recipient device 125) will be associated with the controller 110 MAC address (e.g., in memory storage or cache). Network data intended for the intended recipient device 125 may then be transmit from the newly coupled device 105 to the controller 110.

In one example of ARP manipulation, a newly coupled device 105 may be infected with malware which becomes active upon coupling to a switch 115 and/or a communication network 120. The malware may send network data to any number of other digital devices. Before the attack can proceed, the newly coupled device 105 may send a separate ARP request for the IP address of every other digital device the malware wishes to send data to. The controller 110 detects and responds to each ARP request by sending an ARP reply to each request with the controller 110 MAC address. The controller 110 MAC address may be associated with the IP address of the other digital devices on a table within the newly coupled device 105, switch 115, and/or server (not depicted). The table may be within memory, storage, buffered, and/or cached. Network data is then transmitted from the newly coupled device 105 to the controller 110 for the predetermined time.

If malware or suspicious data within the network data is not detected by the controller 110, the network data may then forward to the intended recipient device 125. In one example, the controller 110 scans and stores the IP address of each intended recipient device 125 of every ARP request. The controller 110 may then transmit an ARP request to receive each intended recipient device's MAC address. If the network data intended for an intended recipient device 125 does not contain suspicious data or a malware attack, the controller 110 may then send the network data to the intended recipient device 125. If the network data contains suspicious data or a malware attack, the network data may not be transmitted by the controller 110.

If, after a predetermined time, no suspicious activity or malware is detected within the network data, then the controller 110 may transmit new ARP responses to the newly coupled device 105, switch 115, and/or server. The new ARP responses can contain the correct MAC address for every ARP request originally sent by the newly coupled device 105. As a result, network data will no longer be directed to the controller 110.

The quarantine module 205 may manipulate dynamic host configuration protocol (DHCP) services to quarantine network data. As a newly coupled device 105 couples to the switch 115 and/or the communication network 120 and requests an IP address from a DHCP server. The quarantine module 205 may respond to the DHCP services request to configure the newly coupled device 105 to transmit network data to the controller 110. In one example, the quarantine module 205 may configure the newly coupled device 105 with a gateway IP address the same as the controller's 110 IP address to send all network data to the controller 110. In other embodiments, the quarantine module 205 may perform DHCP services for the communication network 120 as a DHCP server. If, after the predetermined time no suspicious data or malware is detected, the digital device 105 can be reconfigured so that network data is no longer transmitted to the controller 110.

The quarantine module 205 may send a request to the switch 115 to redirect network data from any newly coupled device 105 to the controller 110 for the predetermined time. In some embodiments, executable code is loaded onto the switch 115. In one example, the executable code configures the switch 115 to direct network data from any newly coupled device 105 to the controller 110 for the predetermined time. In another example, the executable code allows the quarantine module 205 to transmit a request to the switch 115 to direct network data from the newly coupled device 105 to the controller 110. The predetermined time may be set by the quarantine module 205, preloaded into the switch 115, or configured by a user.

The quarantine module 205 may monitor network data directly or receive a copy of the network data over a tap. In one example, the quarantine module 205 monitors and scans network data to detect the presence of a newly coupled device 105. When a newly coupled device 105 is added to the communication network 120 and/or the switch 115, the quarantine module 205 quarantines network data from the newly coupled device 105 for a predetermined time. In another example, a tap may scan network data for newly connected digital devices 105 and alert the quarantine module 205 when such a newly coupled device 105 is discovered. The quarantine module 205 may redirect all network data from the newly coupled device 105 to the controller 110 over a separate link (not depicted) to the switch 115 or the communication network 120. In some embodiments, there is not tap but rather a span port.

The heuristic module 210 can receive network data from the quarantine module 205. The heuristic module 210 applies heuristics and/or probability analysis to determine if the network data might contain suspicious activity. In one example, the heuristic module 210 applies a heuristic which identifies suspicious data within the network data. The heuristic module 210 then flags the network data as suspicious. The network data can then be buffered and organized into a data flow. The data flow can be provided to the scheduler 215. In some embodiments, the network data is provided directly to the scheduler 215 without buffering or organizing the data flow.

The heuristic module 210 can perform any heuristic and/or probability analysis. In one example, the heuristic module 210 performs a dark internet protocol (IP) heuristic. A dark IP heuristic can flag network data coming from the newly coupled device 105 that has not previously been identified by the heuristic module 210. The dark IP heuristic can also flag network data going to an unassigned IP address. In an example, an attacker (e.g., malware within a newly coupled device 105) scans random IP addresses of the communication network 120 to identify an active server or workstation. The dark IP heuristic can flag network data directed to an unassigned IP address.

The heuristic module 210 can also perform a dark port heuristic. A dark port heuristic can flag network data transmitted to an unassigned or unusual port address. Such network data transmitted to an unusual port can be indicative of a port scan by malware such as a worm or a hacker. Further, the heuristic module 210 can flag network data from the newly coupled device 105 that is significantly different than traditional data traffic generally transmitted by the newly coupled device 105. For example, the heuristic module 210 can flag network data from the newly coupled device 105 such as a laptop that begins to transmit network data that is common to a server.

The heuristic module 210 can retain data packets belonging to a particular data flow previously received (e.g., received from a tap) or data flow provided by the quarantine module 205. In one example, the heuristic module 210 receives data packets and stores the data packets within a buffer or other memory. Once the heuristic module 210 receives a predetermined number of data packets from a particular data flow, the heuristic module 210 performs the heuristics and/or probability analysis.

In some embodiments, the heuristic module 210 performs heuristic and/or probability analysis on a set of data packets belonging to a data flow and then stores the data packets within a buffer or other memory. The heuristic module 210 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 210. The buffer can buffer and organize the flagged network data into one or more data flows before providing the one or more data flows to the scheduler 215. In various embodiments, the buffer can buffer network data and stall before providing the network data to the scheduler 215. In one example, the buffer stalls the network data to allow other components of the controller 110 time to complete functions or otherwise clear data congestion.

The scheduler 215 is a module configured to retrieve a virtual machine associated with the newly coupled device 105 or the intended recipient device 125 of the network data. A virtual machine 315 is software that is configured to mimic the performance of a device (e.g., the intended recipient device 125 of the network data). The virtual machine 315 can be retrieved from the virtual machine pool 225.

In some embodiments, the heuristic module 210 transmits the metadata identifying the intended recipient device 125 to the scheduler 215. In other embodiments, the scheduler 215 receives one or more data packets of the network data from the heuristic module 210 and analyzes the one or more data packets to identify the intended recipient device 125. In yet other embodiments, the metadata can be received from the tap.

The scheduler 215 can retrieve and configure the virtual machine to mimic the pertinent performance characteristics of the intended recipient device 125. In one example, scheduler 215 configures the characteristics of the virtual machine to mimic only those features of the intended recipient device 125 that are affected by the network data copied by the tap. The scheduler 215 can determine the features of the intended recipient device 125 that are affected by the network data by receiving and analyzing the network data from the quarantine module 205. Such features of the intended recipient device 125 can include opening ports that are to receive the network data, select device drivers that are to respond to the network data, and configuring any other devices coupled to or contained within the intended recipient device 125 that can respond to the network data. In other embodiments, the heuristic module 210 can determine the features of the intended recipient device 125 that are affected by the network data by receiving and analyzing the network data from the tap. The heuristic module 210 can then transmit the features of the intended recipient device 125 to the scheduler 215.

The optional fingerprint module 220 is configured to determine the packet format of the network data to assist the scheduler 215 in the retrieval and/or configuration of the virtual machine. In one example, the fingerprint module 220 determines that the network data is based on a transmission control protocol/internet protocol (TCP/IP). Thereafter, the scheduler 215 will configure a virtual machine with the appropriate ports to receive TCP/IP packets. In another example, the fingerprint module 220 can configure a virtual machine with the appropriate ports to receive user datagram protocol/internet protocol (UDP/IP) packets. The fingerprint module 220 can determine any type of packet format of a network data.

In other embodiments, the optional fingerprint module 220 passively determines a software profile of the network data to assist the scheduler 215 in the retrieval and/or configuration of the virtual machine. The software profile may comprise the operating system (e.g., Linux RH6.2) of the newly coupled device 105 that generated the network data. The determination can be based on analysis of the protocol information of the network data. In an example, the optional fingerprint module 220 determines that the software profile of network data is Windows XP, SP1. The optional fingerprint module 220 can then configure a virtual machine with the appropriate ports and capabilities to receive the network data based on the software profile. In other examples, the optional fingerprint module 220 passes the software profile of the network data to the scheduler 215 which either selects or configures the virtual machine based on the profile.

The virtual machine pool 225 is configured to store virtual machines. The virtual machine pool 225 can be any storage capable of storing software. In one example, the virtual machine pool 225 stores a single virtual machine that can be configured by the scheduler 215 to mimic the performance of any intended recipient device 125 on the communication network 120. The virtual machine pool 225 can store any number of distinct virtual machines that can be configured to simulate the performance of any intended recipient device 125.

The analysis environment 230 is a module that simulates transmission of the network data between the newly coupled device 105 and the intended recipient device 125 to analyze the effects of the network data upon the intended recipient device 125. The analysis environment 230 can identify the effects of malware or illegitimate computer users (e.g., a hacker, computer cracker, or other computer user) by analyzing the simulation of the effects of the network data upon the intended recipient device 125 that is carried out on the virtual machine. There can be multiple analysis environments 230 to simulate multiple network data.

As the analysis environment 230 simulates the transmission of the network data, behavior of the virtual machine can be closely monitored for unauthorized activity. If the virtual machine crashes, performs illegal operations, performs abnormally, or allows access of data to an unauthorized computer user, the analysis environment 230 can react. In some embodiments, the analysis environment 230 performs dynamic taint analysis to identify unauthorized activity (dynamic taint analysis is further described in FIG. 3.)

Once unauthorized activity is detected, the analysis environment 230 can generate the unauthorized activity signature configured to identify network data containing unauthorized activity. Since the unauthorized activity signature does not necessarily require probabilistic analysis to detect unauthorized activity within network data, unauthorized activity detection based on the unauthorized activity signature may be very fast and save computing time.

In various embodiments, the unauthorized activity signature may provide code that may be used to eliminate or "patch" portions of network data containing an attack. Further, in some embodiments, the unauthorized activity signature may be used to identify and eliminate (i.e., delete) the malware causing the attack. The unauthorized activity signature may also be used to configure digital devices to eliminate vulnerabilities (e.g., correct system settings such as disabling active-x controls in a browser or updating an operating system.)

The analysis environment 230 may store the unauthorized activity signature within the signature module 235. The analysis environment 230 may also transmit or command the transmission of the unauthorized activity signature to one or more other controllers 110, switches 115, digital devices 105, and/or servers. By automatically storing and transmitting the unauthorized activity signature, known malware, previously unidentified malware, and the activities of illicit computer users can be quickly controlled and reduced before a computer system is damaged or compromised. The analysis environment 230 is further discussed with respect to FIG. 3.

The signature module 235 receives, authenticates, and stores unauthorized activity signatures. The unauthorized activity signatures may be generated by the analysis environment 230 or another controller 110. The unauthorized activity signatures may then be transmitted to the signature module 235 of one or more controllers 110.

The policy engine 240 is coupled to the heuristic module 210 and is a module that may identify network data as suspicious based upon policies contained within the policy engine 240. In one example, a newly coupled device 105 can be a computer designed to attract hackers and/or worms (e.g., a "honey pot"). The policy engine 240 can contain a policy to flag any network data directed to the "honey pot" as suspicious since the "honey pot" should not be receiving any legitimate network data. In another example, the policy engine 240 can contain a policy to flag network data directed to any intended recipient device 125 that contains highly sensitive or "mission critical" information.

The policy engine 240 can also dynamically apply a rule to copy all network data related to network data already flagged by the heuristic module 210. In one example, the heuristic module 210 flags a single packet of network data as suspicious. The policy engine 240 then applies a rule to flag all data related to the single packet (e.g., data flows) as suspicious. In some embodiments, the policy engine 240 flags network data related to suspicious network data until the analysis environment 230 determines that the network data flagged as suspicious is related to unauthorized activity.

The policy engine 240 may scan network data to detect unauthorized activity based upon an unauthorized activity signature. In some embodiments, the policy engine 240 retrieves the unauthorized activity signature from the signature module 235. The network data is then scanned for unauthorized activity based on the unauthorized activity signature.

The policy engine 240 can scan the header of a packet of network data as well as the packet contents for unauthorized activity. In some embodiments, the policy engine 240 scans only the header of the packet for unauthorized activity based on the unauthorized activity signature. If unauthorized activity is found, then no further scanning may be performed. In other embodiments, the policy engine 240 scans the packet contents for unauthorized activity.

Advantageously, unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 240, the heuristic module 210, or the signature module 235 may take action. In one example, the policy engine 240 may generate a rule or command the quarantine module 205 to permanently quarantine the newly coupled device 105 and delete or bar the packet from the communication network 120. The policy engine 240 and/or the quarantine module 205 may also quarantine, delete, or bar other packets belonging to the same data flow as the unauthorized activity packet.

Figure 3:
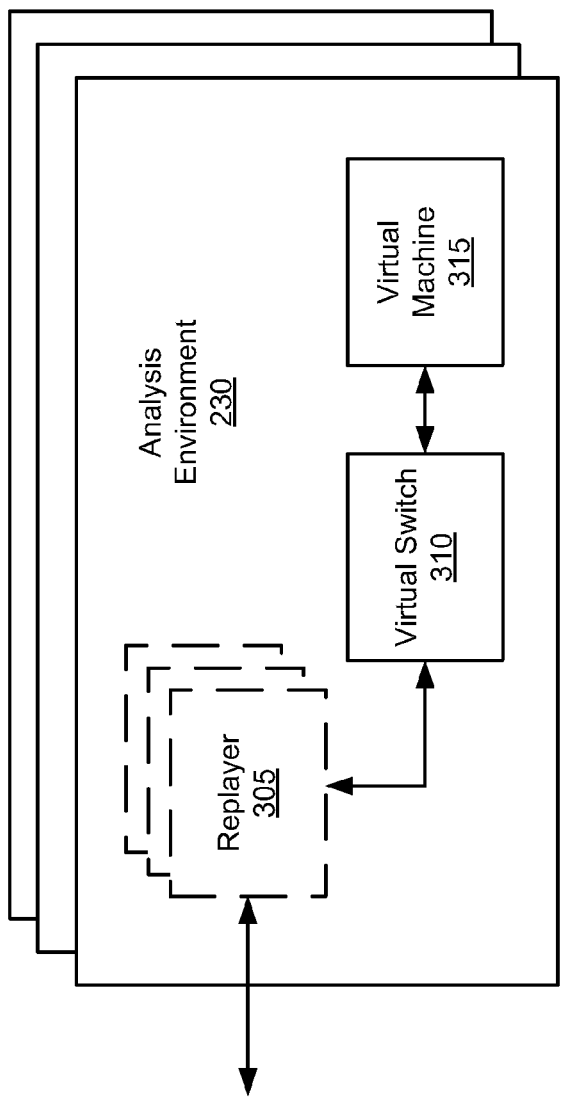
FIG. 3 is a block diagram of an exemplary analysis environment.

FIG. 3 depicts an analysis environment 230, in accordance with one embodiment of the present invention. The analysis environment 230 comprises an optional replayer 305, a virtual switch 310, and a virtual machine 315. The replayer 305 receives network data that has been flagged by the heuristic module 210 and replays the network data in the analysis environment 230. In some embodiments, the replayer 305 mimics the behavior of the newly coupled device 105 in transmitting the flagged network data. There can be any number of replayers 305 simulating the transmission of network data between the newly coupled digital device 105 and the intended recipient device 125. In a further embodiment, the replayer dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session. In other embodiments, the network data received from the heuristic module 210 is transmitted to the virtual machine 315 without a replayer 305.

The virtual switch 310 is software that is capable of forwarding packets of flagged network data to the virtual machine 315. In one example, the replayer 305 simulates the transmission of the data flow by the newly coupled device 105. The virtual switch 310 simulates the communication network 120 and the virtual machine 315 simulates the intended recipient device 125. The virtual switch 310 can route the data packets of the data flow to the correct ports of the virtual machine 315.

The virtual machine 315 is a representation of the intended recipient device 125 that can be provided to the analysis environment 230 by the scheduler 215. In one example, the scheduler 215 retrieves a virtual machine 315 from the virtual machine pool 225 and configures the virtual machine 315 to mimic the intended recipient device 125. The configured virtual machine 315 is then provided to the analysis environment 230 where it can receive flagged network data from the virtual switch 310.

As the analysis environment 230 simulates the transmission of the network data, behavior of the virtual machine 315 can be closely monitored for unauthorized activity. If the virtual machine 315 crashes, performs illegal operations, performs abnormally, or allows access of data to an unauthorized computer user, the analysis environment 230 can react.

In some embodiments, the analysis environment 230 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 230 monitors and analyzes the behavior of the virtual machine 315 in order to determine a specific type of malware or the presence of an illicit computer user. The analysis environment 230 can also generate computer code configured to eliminate new viruses, worms, or other malware. In various embodiments, the analysis environment 230 can generate computer code configured to identify data within the network data indicative of a malware attack, repair damage performed by malware, or the illicit computer user. By simulating the transmission of suspicious network data and analyzing the response of the virtual machine, the analysis environment 230 can identify known and previously unidentified malware and the activities of illicit computer users before a computer system is damaged or compromised.

In other embodiments, the controller 110 does not comprise a heuristic module 210 and the analysis environment 230 does not comprise a replayer 305. In one example, the controller 110 receives network data. The policy engine 240 can scan the network data to determine if the newly coupled device 105 is on a white list (further described herein). Further, the policy engine 240 can compare some or all of the network data to a signature (i.e., an unauthorized activity signature) to detect and/or identify a malware attack. The analysis environment 230 can receive the network data and orchestrate the transmission of the network data by transmitting the copy of the network data to a virtual machine 315. The analysis environment 230 can then monitor the reaction of the virtual machine 315 to the copy of the network data to identify a malware attack.

Figure 4:
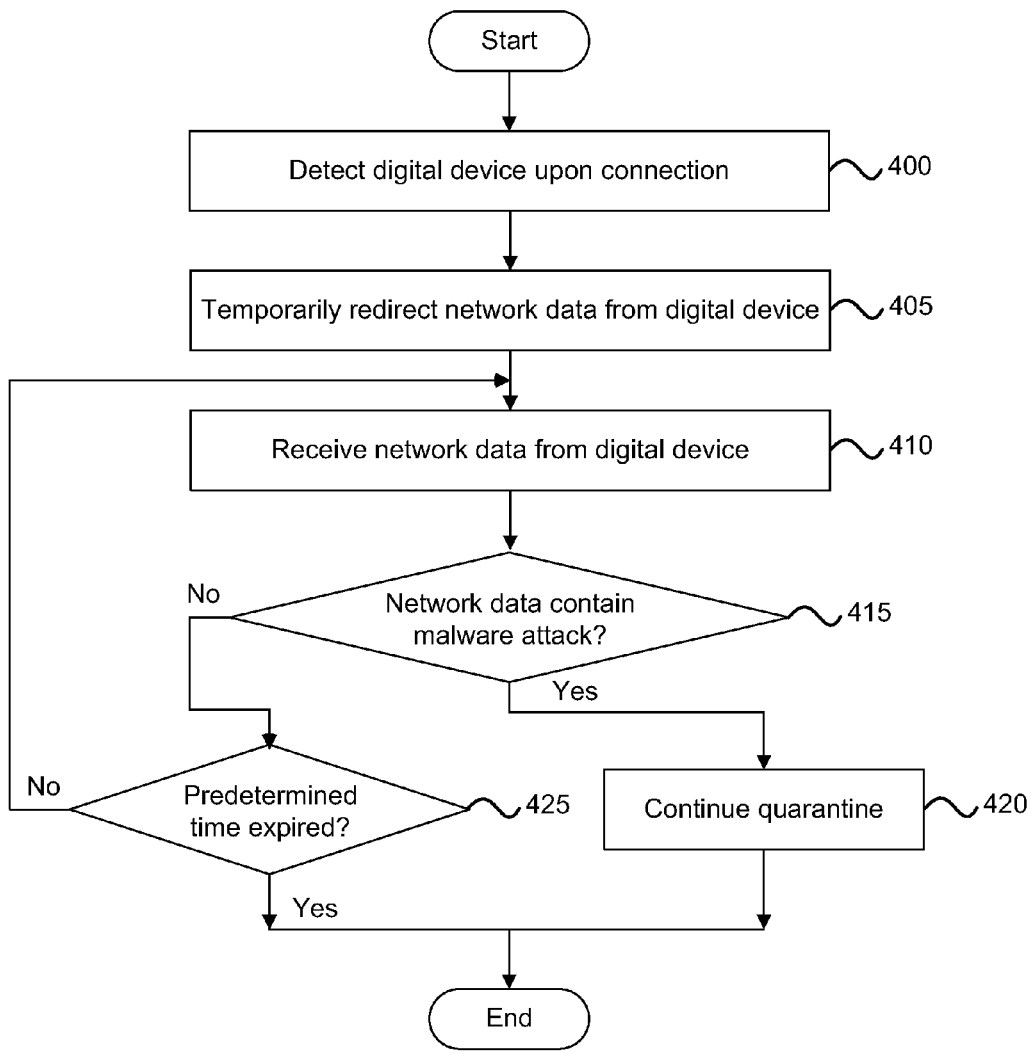
FIG. 4 is a flowchart of an exemplary method for malware containment upon connection of a digital device.

FIG. 4 is a flowchart of an exemplary method for malware containment upon connection of a newly coupled device 105. In step 400, the controller 110 detects a newly coupled device 105 upon connection with the switch 115 and/or the communication network 120. In one example, a user brings a laptop or other computer from home and then couples the laptop or other computer to the work communication network 120. The newly coupled device 105 (i.e., laptop or other computer) requests network resources which is detected by the controller 110.

In various embodiments, the controller 110 receives copies of network data from the switch 115 or the communication network 120 over a tap. The tap can transparently copy network data from the switch 115 and/or the communication network 120. The copy of network data is analyzed to determine if a newly coupled device 105 is requesting network services. In other embodiments, the controller 110 monitors network data directly to identify requests for network services.

In step 405, the quarantine module 205 temporarily redirects the network data from the newly coupled device 105. In one example, the controller 110 identifies a newly coupled device 105. The quarantine module 205 redirects network data transmitted from the newly coupled device 105 for a predetermined time.

In step 410, the controller 110 receives the network data from the newly coupled device 105. In various embodiments, the network data is received over a separate link without a tap between the controller 110 and the switch 115 or communication network 120. In one example, the controller 110 comprises an IP address. Network data directed to the controller 110 IP address (e.g., network data transmitted by the newly coupled device 105 to a gateway IP address that is the same as the controller 110 IP address) may be received by the controller 110 over the link.

In step 415, the controller 110 determines if a malware attack is within the network data. The heuristic module 210 can determine if the network data contains suspicious activity. In some embodiments, if the network data contains suspicious activity, then the heuristic module 210 directs the quarantine module 205 to take corrective action in step 420. In other embodiments, if the network data contains suspicious activity, the network data flagged as suspicious is directed to the analysis environment 230 for analysis to identify unauthorized activity. If unauthorized activity is identified, then the analysis environment 230 directs the quarantine module 205 to take corrective action in step 420.

In step 420, the quarantine module 205 takes corrective action. Corrective actions can include, but are not limited to, the permanent quarantine of network data from the newly coupled device 105. In various embodiments, the controller 110 continues to analyze network data from the newly coupled device 105 to further identify the malware or identify different types of malware on the newly coupled device 105. Notifications of malware may be sent to the newly coupled device 105, server, or security stations on the communication network 120. The signature module 235 may generate unauthorized activity signatures based on the identified malware attack.

If the heuristic module 210 does not flag the network data as suspicious and/or malware is not found by the analysis environment 230, then the quarantine module 205 determines if the predetermined time is expired. If the predetermined time is not expired, the controller 110 continues to receive network data from the digital device in step 410. If the predetermined time is expired, then the method ends. In various embodiments, if the heuristic module 210 does not flag the network data as suspicious and/or malware is not found by the analysis environment 230, the controller 110 (e.g., quarantine module 205) forwards the network data to the intended recipient device 125.

It will be appreciated by those skilled in the art, that the process depicted in FIG. 4 may simply continue to repeat upon the continuation of quarantine (step 420) or the expiration of the predetermined time (step 425). In one example, if the network data contains a malware attack (step 425), the redirection of the network data from the newly coupled device 105 can continue until reset by the IT administrator or the malware attack is no longer detected. In the meantime, however, other newly coupled devices 105 can join the network which may trigger the method of FIG. 4. The method of FIG. 4 can run in parallel or series (e.g., simultaneously) for many different newly coupled devices 105. In another example, once the predetermined time expires (step 425) the method can continue to digital devices upon connection (step 400).

Figure 5:
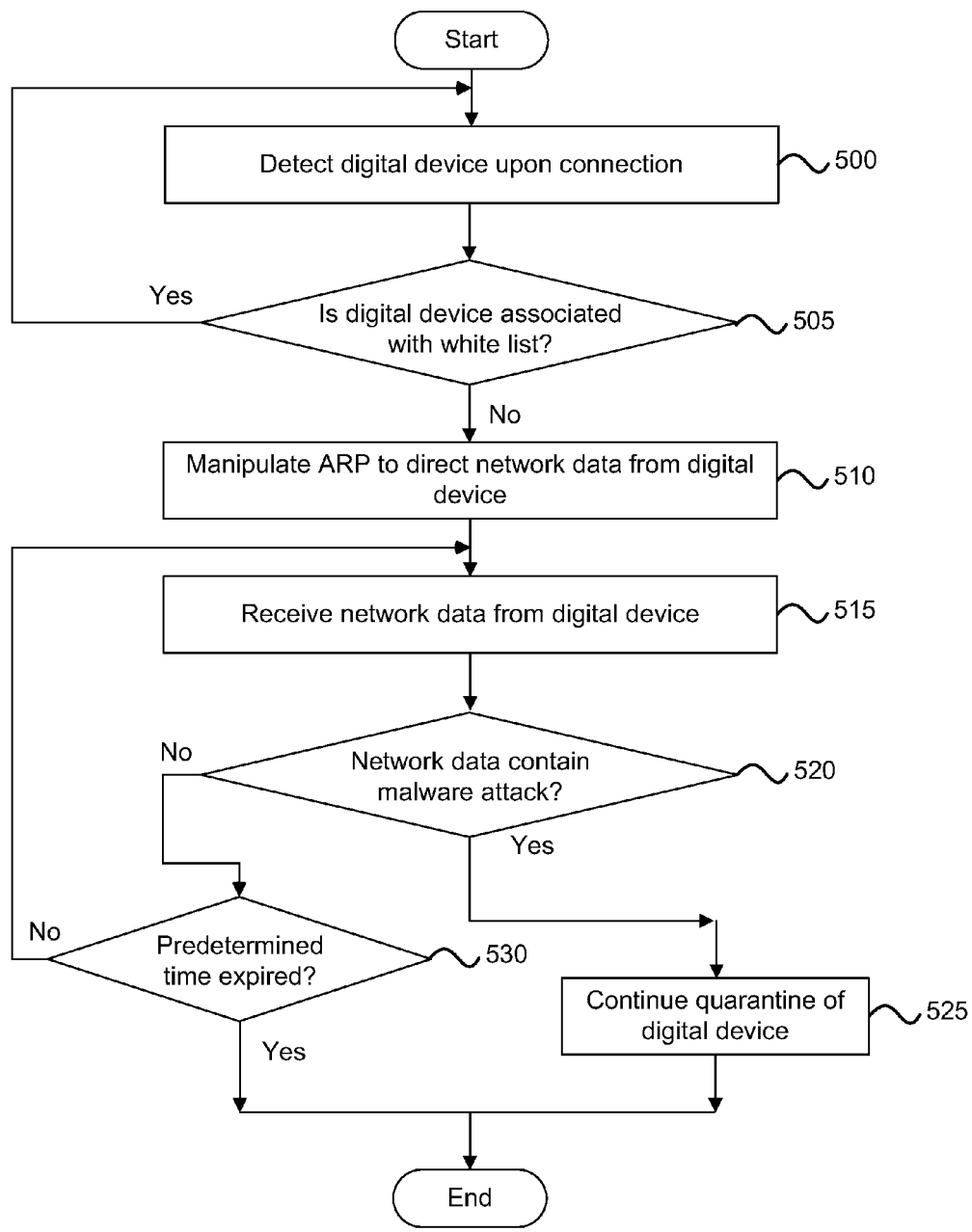
FIG. 5 is another flowchart of an exemplary method for malware containment upon connection of a digital device.

FIG. 5 is another flowchart of an exemplary method for malware containment upon connection of a newly coupled device 105. In step 500, the controller 110 detects the newly coupled device 105 upon connection with the switch 115 and/or the communication network 120. In step 505, the quarantine module 205 determines if the newly coupled device 105 is associated with a white list. A white list comprises a table that identifies various digital devices and policies. In one example, the newly coupled device 105 of a chief executive officer (CEO) or chief information office (CIO) of a company may be identified within the white list. The policy associated with the newly coupled device 105 of the CEO or CIO may command the quarantine module 205 to not quarantine the newly coupled device 105. If the newly coupled device 105 is associated with the white list, the method may end. If the newly coupled device 105 is not associated with a white list, then the quarantine module 205 manipulates ARP to direct network data transmitted from the newly coupled device 105 to the controller 110 in step 510.

Although step 505 as described indicates that the method may end if the newly coupled device 105 is associated with one or more white lists, other actions may be taken. In one example, if a newly coupled device 105 is associated with a white list, the quarantine may last for a shorter or longer predetermined time. As such, the quarantine module 205 would then manipulate ARP to direct the network data from the newly coupled device 105 to the controller 110 in step 510.

In step 515, the controller 110 receives the network data from the newly coupled device 105. In step 520, the controller 110 determines if the network data contains a malware attack. In various embodiments, the network data is analyzed to determine whether the network data is suspicious. For example a heuristic module 210, such as the heuristic module 210, can analyze the network data. The heuristic module 210 can base the determination on heuristic and/or probabilistic analyses. In various embodiments, the heuristic module 210 has a very low threshold to determine whether the network data is suspicious. For example, a single command within the network data directed to an unusual port of the destination device can cause the network data to be flagged as suspicious.

The heuristic module 210 can alternatively include flagging network data as suspicious based on policies such as the identity of a newly coupled device 105, the intended recipient device 125, or the activity contained within the network data. In one example, even if the heuristic module 210 does not flag the network data, the network data can be flagged as suspicious based on a policy if the network data was transmitted from a device that does not normally transmit network data. Similarly, based on another policy, if the intended recipient device 125 or the newly coupled device 105 contains trade secrets or other critical data, then any network data so transmitted can be flagged suspicious. Similarly, if the network data is directed to a particularly important database or is attempting to gain rights or privileges within the communication network 120, the switch 115 or the intended recipient device 125, then the network data can be flagged as suspicious. In various embodiments, the policy engine 240 flags network data based on these and/or other policies.

In some embodiments, if the network data is flagged as suspicious, the quarantine module 205 may continue the quarantine of the network data indefinitely in step 525. In other embodiments, if the network data is flagged as suspicious, the network data may be provided to the analysis environment 230 to analyze the response of a virtual machine to the network data to identify malware attacks or other unauthorized activity. If a malware attack or other unauthorized activity is identified, then the quarantine of the network data from the newly coupled device 105 may continue indefinitely in step 525. If the network data is not flagged as suspicious or there is no evidence of a malware attack or other unauthorized activity in the network data previously flagged as suspicious, then the quarantine module 205 determines if the predetermined time has expired in step 530. If the predetermined time has not expired, then the controller 110 continues to receive the network data in step 515. If the predetermined time has expired, the method ends.

Figure 6:
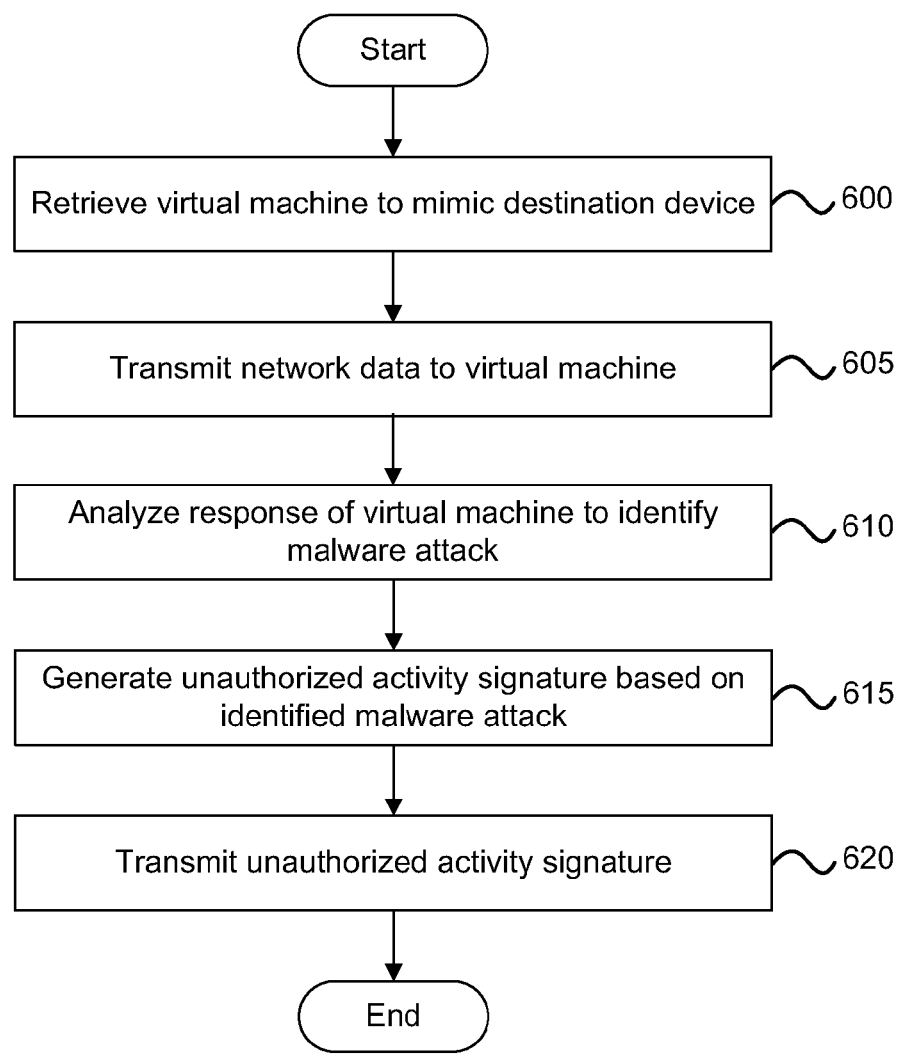
FIG. 6 is a flowchart of an exemplary method of generating and transmitting an unauthorized activity signature.

FIG. 6 is a flowchart of an exemplary method of analyzing network data to generate an unauthorized activity signature. In step 600, the scheduler 215 scans the network data previously flagged as suspicious by the heuristic module 210 to determine the intended recipient device 125. In one example, the scheduler 215 scans the destination IP address contained within the network data to identify the intended recipient device 125. The scheduler 215 may then retrieve a virtual machine 315 from the virtual machine pool 225. The virtual machine 315 may be previously configured to be similar to the intended recipient device 125. If there is no virtual machine 315 previously configured to be similar to the intended recipient device 125, then a generic virtual machine 315 may be retrieved by the scheduler 215. The scheduler 215 may configure to the virtual machine 315 retrieved from the virtual machine pool 225 to receive the network data (e.g., open ports, reduce or eliminate security settings, etc.) The scheduler 215 may then provide the virtual machine 315 to the analysis environment 230.

In step 610, the analysis environment 230 analyzes the response of the virtual machine 315 to the network data to identify a malware attack. In one example, an optional replayer 305 is configured to perform similarly to the newly coupled device 105 and transmit the network data over a virtual switch 310 to the virtual machine 315. In various embodiments, there may be any number of replayers 305 configured to transmit network data to different virtual machines 315 in parallel. Similarly, multiple analysis environments 230 may operate in parallel. The analysis environment 230 analyzes the response of the virtual machine 315 to the network data (e.g., with taint analysis).

If the network data does not contain unauthorized activity, then the method may end. If the network data contains unauthorized activity, then an unauthorized activity signature is generated based on the unauthorized activity in step 615. The unauthorized activity signature may be generated by the analysis environment 230 or the signature module 235.

In step 620, the unauthorized activity signature is transmitted to one or more other controllers 110 or any digital device (e.g., server, newly coupled device 105, switch 115). The receiving controller 110 can store the unauthorized activity signature within the receiving controller's signature module 235 or policy engine 240. The policy engine 240 may use the unauthorized activity signature to scan network data received by the controller 110 to flag the network data as suspicious or containing unauthorized activity without any further analysis (by either the heuristic module 210 or the analysis environment 230).

Optionally, the unauthorized activity signature may be authenticated. In some embodiments, the analysis environment 230 can generate an authentication code along with the unauthorized activity signature. The authentication code can then be scanned to determine that the unauthorized activity signature is verified. In one example, the analysis environment 230 generates the unauthorized activity signature and an authentication code. The analysis environment 230 transmits the unauthorized activity signature and the authentication code to another controller 110. The controller 110 verifies the authentication code to ensure that the unauthorized activity signature is genuine. If the unauthorized activity signature is authenticated, then the signature module 235 stores the unauthorized activity signature.

The unauthorized activity signature can also be encrypted. In one example, the controller 110 generates, encrypts, and transmits the unauthorized activity signature to another controller 110. The receiving controller 110 can decrypt the unauthorized activity signature and store the unauthorized activity signature within the signature module 235. In some embodiments, the controller 110 generates an authentication code and proceeds to encrypt the authentication code and the unauthorized activity signature prior to transmitting the authentication code and the unauthorized activity signature to another controller 110.

Figure 7:
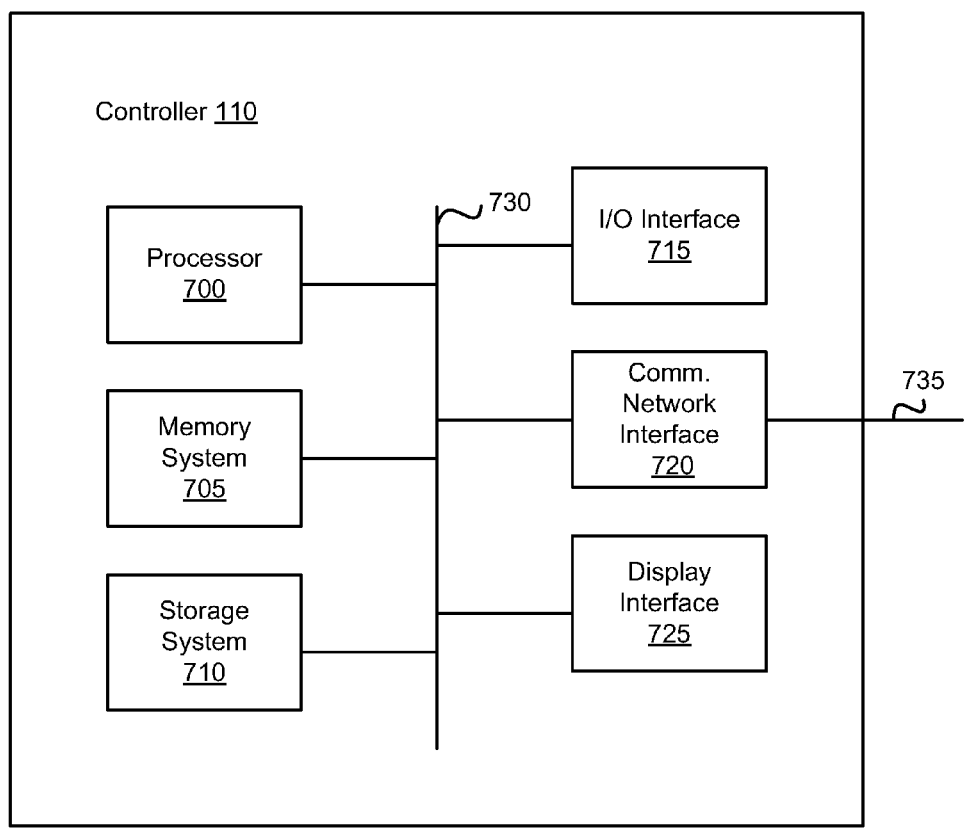
FIG. 7 is a block diagram of an exemplary controller in which embodiments of the present invention may be practiced.

FIG. 7 is a block diagram of the controller 110 (FIG. 1), in accordance with one embodiment of the present invention. The controller 110 comprises a processor 700, a memory system 705, a storage system 710, an I/O interface 715, a communication network interface 720, and a display interface 725 which are all coupled to a system bus 730. The processor 700 is configured to execute executable instructions. In some embodiments, the processor 700 comprises circuitry or any one or more processors capable of processing the executable instructions.

The memory system 705 is any memory configured to store data. Some examples of the memory system 705 include storage devices, such as RAM or ROM.

The storage system 710 is any storage configured to retrieve and store data. Some examples of the storage system 710 are flash drives, hard drives, optical drives, and/or magnetic tape. The storage system 710 can comprise a database or other data structure configured to hold and organize data (e.g., network data, copies of network data, buffered data.) In some embodiments, the controller 110 includes memory 705 in the form of RAM and storage 710 in the form of flash data. The memory system 705 and/or the storage system 710 can comprise cache and buffers configured to retain network data or copies of network data.

The input/output (I/O) interface 715 is any device that can receive input and provide output to a user. The I/O interface 715 can be, but is not limited to, a keyboard, a mouse, a touchscreen, a keypad, a biosensor, or floppy disk drive.

The communication network interface 720 can be coupled to any user device via the links 735. The communication network interface 720 may support communication over a USB connection, a firewire connection, an Ethernet connection, a serial connection, a parallel connection, or an ATA connection. The communication network interface 720 may also support wireless communication (e.g., 802.11 a/b/g/n or wireless USB). It will be apparent to those skilled in the art that the communication network interface 720 can support many wired and wireless standards.

The display interface 725 is an interface configured to support a display, monitor, or screen. In some embodiments, the controller 110 comprises a graphical user interface to be displayed to a user over a monitor in order to allow the user to control the controller 110.

The above-described modules can be comprised of instructions that are stored on storage media. The instructions can be retrieved and executed by a processor (e.g., the processor 700). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A malware containment method comprising:
   detecting a digital device upon connection with a communication network;
   temporarily redirecting network data from the digital device by configuring a network switch of the communication network to direct the network data from the digital device to a controller coupled to the communication network; and
   analyzing the temporarily redirected network data by the controller to detect malware within the digital device by at least configuring a virtual machine to receive the network data and analyzing a response of the virtual machine to processing of the network data within the virtual machine to identify a malware attack;
   continuing to redirect the network data from the digital device until expiration of a predetermined period of time without detection of malware; and
   continuing to redirect the network data from the digital device beyond the predetermined period of time when malware is detected.

2. The method of claim 1, wherein temporarily redirecting network data comprises Address Resolution Protocol (ARP) manipulation to temporarily direct the network data from the digital device to the controller.

3. The method of claim 1, wherein temporarily redirecting network data comprises configuring Dynamic Host Configuration Protocol (DHCP) services to temporarily direct the network data from the digital device to the controller.

4. The method of claim 1, wherein analyzing the temporarily redirected network data further comprises determining if the digital device is associated with a white list, and halting the redirecting if the digital device is determined to be associated with the white list.

5. The method of claim 1, wherein analyzing the temporarily redirected network data further comprises comparing some or all of the temporarily redirected network data with an unauthorized activity signature to detect a malware attack.

6. The method of claim 1, further comprising generating an unauthorized activity signature based on a detection of the malware.

7. The method of claim 6, further comprising:
   storing the unauthorized activity signature; and
   sending the unauthorized activity signature to another digital device.

8. The method of claim 6, wherein the unauthorized activity signature is used to subsequently identify the malware and mitigate vulnerabilities including changing a setting settings in a browser application or an operating system.

9. The method of claim 1, wherein analyzing the temporarily redirected network data comprises:
   analyzing the temporarily redirected network data with a heuristic to identify the network data has a prescribed likelihood of including malware and to use metadata associated with the network data to configure the virtual machine.

10. The method of claim 1 further comprising sending information to a client associated with the digital device to remove the malware.

11. A malware containment system comprising:
    a memory to store instructions; and
    a controller for containing malware comprising:
    a processor; and
    a memory coupled to the processor, the memory comprises
    a quarantine module stored in the memory, the quarantine module that, when executed by the processor, configured to execute instructions stored in the memory to detects a digital device upon connection with a communication network, to temporarily redirect network data from the digital device to the controller, and
    an analysis module a policy engine stored in the memory, the analysis module that, when executed by the processor, configured to analyzes the temporarily redirected network data to detect malware within the digital device by at least (i) receiving and processing, by configuring a virtual machine, to receive the temporarily redirected network data and (ii) analyzing a response of the virtual machine to the processing of the temporarily redirected network data within the virtual machine to identify a malware attack,
    wherein the quarantine module is further configured to temporarily redirect the network data until expiration of a predetermined period of time without identifying the malware attack and continuing to redirect the network data beyond the predetermined period of time if the malware attack has been identified.

12. The system of claim 11, wherein the quarantine module is configured to manipulate Address Resolution Protocol (ARP) to temporarily direct the network data from the digital device to the controller.

13. The system of claim 11, wherein the quarantine module to configure Dynamic Host Configuration Protocol (DHCP) services to temporarily direct the network data from the digital device to the controller.

14. The system of claim 11, wherein the memory further comprises a policy engine that, when executed by the processor, analyzes the temporarily redirected network data by at least determining if the digital device is associated with a white list.

15. The system of claim 11, wherein the memory further comprises a policy engine that, when executed by the processor, analyzes the temporarily redirected network data by at least comparing some or all of the temporarily redirected network data with an unauthorized activity signature to detect malware.

16. The system of claim 11, wherein the memory further comprising:
    a heuristic module that, when executed by the processor, analyzes the temporarily redirected network data with a heuristic to identify the temporarily redirected network data has a prescribed likelihood of including malware; and
    a scheduler that, when executed by the processor, configures the virtual machine based on metadata associated with the temporarily redirected network data.

17. The system of claim 15, wherein the memory further comprising a signature module that, when executed by the processor, generates an unauthorized activity signature based on a detection of the malware.

18. The system of claim 17, wherein the unauthorized activity signature is used by the policy engine to subsequently identify the malware associated with another malware attack without virtual execution of the malware.

19. A non-transitory machine readable medium having embodied thereon executable code, the executable code being executable by a processor for performing a malware containment method, the method comprising:
   detecting a digital device upon connection with a communication network;
   redirecting network data from the digital device until a predetermined period of time expires by configuring a network switch of the communication network to direct the network data from the digital device to a controller coupled to the communication network;
   analyzing the redirected network data during the predetermined period of time to detect malware within the digital device by at least configuring a virtual machine to receive the network data and analyzing a response of the virtual machine to processing of the network data within the virtual machine to identify a malware attack; and
   generating an unauthorized activity signature directed to the newly detected malware associated with the malware attack,
   wherein the redirecting of the network data from the digital device (i) continues until expiration of the predetermined period of time without detection of malware and (ii) continues after the predetermined period of time expires when the malware is detected during the predetermined period of time.

20. The non-transitory machine readable medium of claim 19, wherein the unauthorized activity signature is further used to alter at least one setting in one of an application or an operating system that is susceptible to the malware.

21. The non-transitory machine readable medium of claim 20, wherein the altered setting includes a setting in a browser application.

22. The method of claim 10, wherein the information comprises an unauthorized activity signature that is generated by the controller based on a detection of the malware.

23. A malware containment method comprising:
   detecting a digital device upon connection with a communication network;
   temporarily redirecting network data from the digital device by configuring a network switch of the communication network to direct the network data from the digital device to a controller coupled to the communication network; and
   analyzing the temporarily redirected network data to detect malware within the digital device by at least configuring a virtual machine to receive the network data and analyzing a response of the virtual machine to processing of the network data within the virtual machine to identify a malware attack; and
   generating an unauthorized activity signature based on detection of the malware, the unauthorized activity signature is used to subsequently identify the malware and mitigate vulnerabilities including changing a setting in a browser application on the digital device.

24. The method of claim 23, wherein temporarily redirecting network data comprises one of (1) Address Resolution Protocol (ARP) manipulation to temporarily direct the network data from the digital device to the controller and (2) configuring Dynamic Host Configuration Protocol (DHCP) services to temporarily direct the network data from the digital device to the controller.

25. The method of claim 23, wherein analyzing the temporarily redirected network data comprises determining if the digital device is associated with a white list, and halting the redirecting if the digital device is determined to be associated with the white list.

26. The method of claim 23, wherein analyzing the temporarily redirected network data comprises comparing some or all of the temporarily redirected network data with an unauthorized activity signature to detect a malware attack.

27. The method of claim 23, wherein the changing of the setting in the browser application comprises disabling ActiveX controls in the browser application.

28. The method of claim 26, further comprising:
   storing the unauthorized activity signature; and
   sending the unauthorized activity signature to another digital device.

29. The method of claim 23, wherein analyzing the temporarily redirected network data comprises:
   analyzing the temporarily redirected network data with a heuristic to identify network data has a prescribed likelihood of including malware and to use metadata associated with the network data to configure the virtual machine.

30. The method of claim 23, wherein the controller is configured to continue the redirecting if malware is not detected until after a predetermined period of time expires, and continue the redirecting if malware is detected beyond the predetermined period of time.

31. A malware containment system controller, comprising:
   a processor; and
   a memory coupled to the processor, the memory comprises:
      a quarantine module stored in the memory and configured, when executed by the processor, to detect a digital device upon connection with a communication network, to temporarily redirect network data from the digital device to the controller;
      an analysis module stored in the memory and configured, when executed by the processor, to analyze the temporarily redirected network data to detect malware within the digital device by at least (i) receiving and processing the temporarily redirected network data by a virtual machine and (ii) analyzing a response of the virtual machine to the processing of the temporarily redirected network data to identify a malware attack, and
      a signature module stored in the memory and configured, when executed by the processor, to generate an unauthorized activity signature based on detection of the malware, the unauthorized activity signature is used to subsequently identify the malware and mitigate vulnerabilities including changing a setting in a browser application on the digital device.

32. The controller of claim 31, wherein the quarantine module stored in the memory is configured to manipulate Address Resolution Protocol (ARP) to temporarily direct the network data from the digital device to the controller.

33. The controller of claim 31, wherein the quarantine module stored in the memory to configure Dynamic Host Configuration Protocol (DHCP) services to temporarily direct the network data from the digital device to the controller.

34. The controller of claim 31, wherein the memory further comprises a policy engine that is configured, when executed by the processor, to analyze the temporarily redirected network data by at least determining if the digital device is associated with a white list.

35. The controller of claim 31, wherein the memory further comprises a policy engine that is configured, when executed by the processor, to analyze the temporarily redirected network data by at least comparing some or all of the temporarily redirected network data with the unauthorized activity signature to detect malware.

36. The controller of claim 35, wherein the signature module is further configured to store the unauthorized activity signature and send the unauthorized activity signature to another digital device.

37. The controller of claim 31, wherein the memory further comprises:
   a heuristic module that is configured, when executed by the processor, to analyze the temporarily redirected network data with a heuristic to identify the temporarily redirected network data has a prescribed likelihood of including malware; and
   a scheduler that, when executed by the processor, configures the virtual machine based on metadata associated with the temporarily redirected network data.

38. The controller of claim 31, wherein the unauthorized activity signature is used to change the setting in the browser application by disabling ActiveX controls in the browser application.

39. The controller of claim 31, wherein the unauthorized activity signature is used by a policy engine stored in the memory and executed by the processor, to subsequently identify the malware associated with another malware attack without virtual execution of the malware.

40. A non-transitory machine readable medium having embodied thereon executable code, the executable code being executable by a processor for performing a malware containment method comprising:
   detecting a digital device upon connection with a communication network;
   redirecting network data from the digital device until a predetermined period of time expires by configuring a network switch of the communication network to direct the network data from the digital device to a controller coupled to the communication network;
   analyzing the redirected network data during the predetermined period of time to detect malware within the digital device by at least configuring a virtual machine to receive the network data and analyzing a response of the virtual machine to processing of the network data within the virtual machine to identify a malware attack;
   generating an unauthorized activity signature directed to the newly detected malware associated with the malware attack, the unauthorized activity signature is further used to subsequently mitigate vulnerabilities in one of an application or an operating system that is susceptible to the malware by changing a setting in the application or the operating system.

41. The non-transitory machine readable medium of claim 40, wherein the unauthorized activity signature is to subsequently change the setting in a browser application.

42. The non-transitory machine readable medium of claim 41, wherein the setting in the browser application includes ActiveX controls in the browser application.

43. The non-transitory machine readable medium of claim 40 having embodied thereon the executable code that is executable by the processor to further store the unauthorized activity signature and send the unauthorized activity signature to another digital device.

44. The system of claim 11, wherein the memory comprises a semiconductor memory or a storage drive that includes at least one of a flash drive, a hard disk drive or an optical drive.

45. The controller of claim 31, wherein the memory comprises a semiconductor memory or a storage drive that includes at least one of a flash drive, a hard disk drive or an optical drive.

* * * * *